United States Patent [19]
Whitman

[11] 3,802,520
[45] Apr. 9, 1974

[54] COMBINATION MASONRY DIAMOND BIT AND METAL HOLE-CUTTING SAW

[76] Inventor: Lester W. Whitman, 14501 S. Kolin, Midlothian, Ill. 60445

[22] Filed: Feb. 16, 1972

[21] Appl. No.: 226,849

[52] U.S. Cl............ 175/315, 175/381, 408/36, 408/57, 408/204
[51] Int. Cl........................ E21b 9/16, B23b 51/00
[58] Field of Search ........... 408/204, 206, 207, 36, 408/57, 224; 175/315, 381, 382, 383

[56] References Cited
UNITED STATES PATENTS

| | | | |
|---|---|---|---|
| 2,754,864 | 7/1956 | Elsy | 408/204 X |
| 1,661,426 | 3/1928 | Hillman | 175/381 X |
| 2,564,451 | 7/1951 | Sandberg et al. | 408/206 |

*Primary Examiner*—Gil Weidenfeld
*Attorney, Agent, or Firm*—Wood, Herron & Evans

[57] ABSTRACT

A combined masonry drill and metal hole-cutting saw. The masonry drill includes a drill head with diamond cutting teeth on one end. The metal saw is a circular hole-cutting saw mounted within the drill head. Means, including guide slots in the drill head and projections on a saw mounting member, are provided for locking the saw in a retracted position so that only the diamond cutting surface is exposed; and in an extended, operative position with the saw exposed. Fluid connections are made through the saw mounting to permit fluid flow through the drill head to the diamond cutter. A sealing member surrounds the drill head slots to prevent leakage of fluid.

7 Claims, 5 Drawing Figures

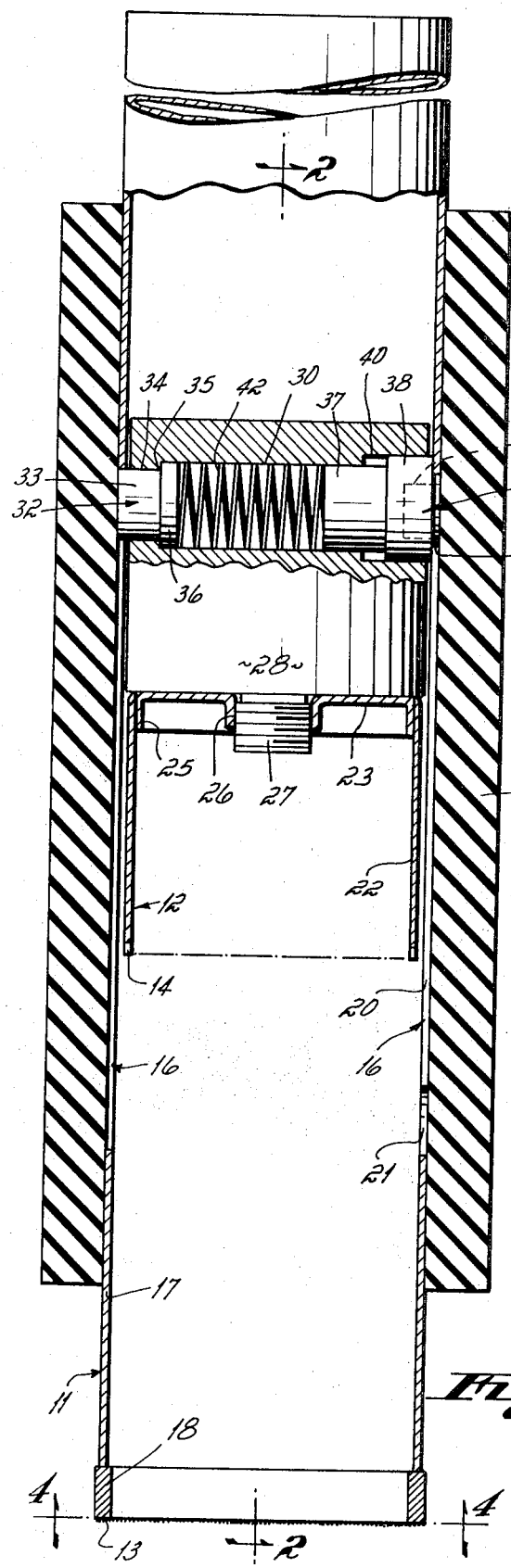
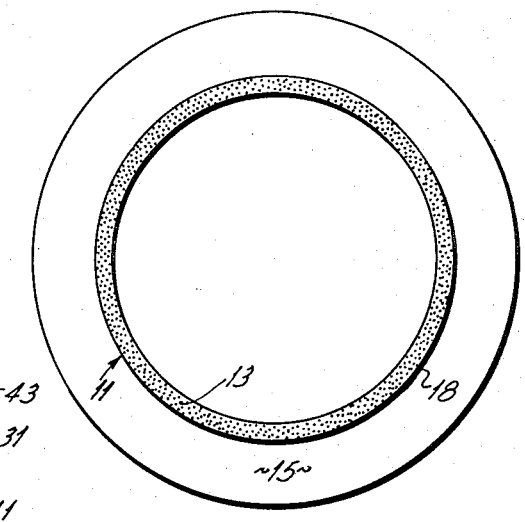
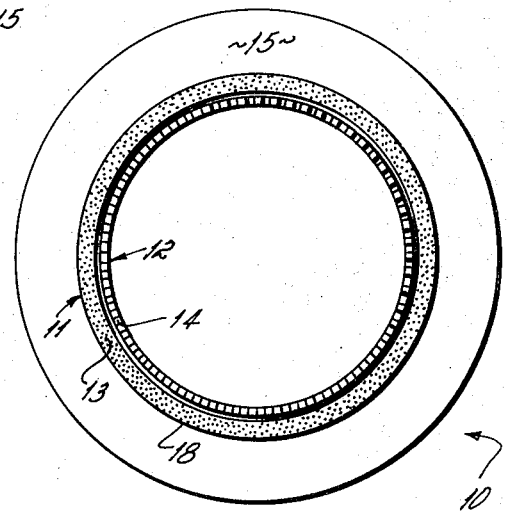

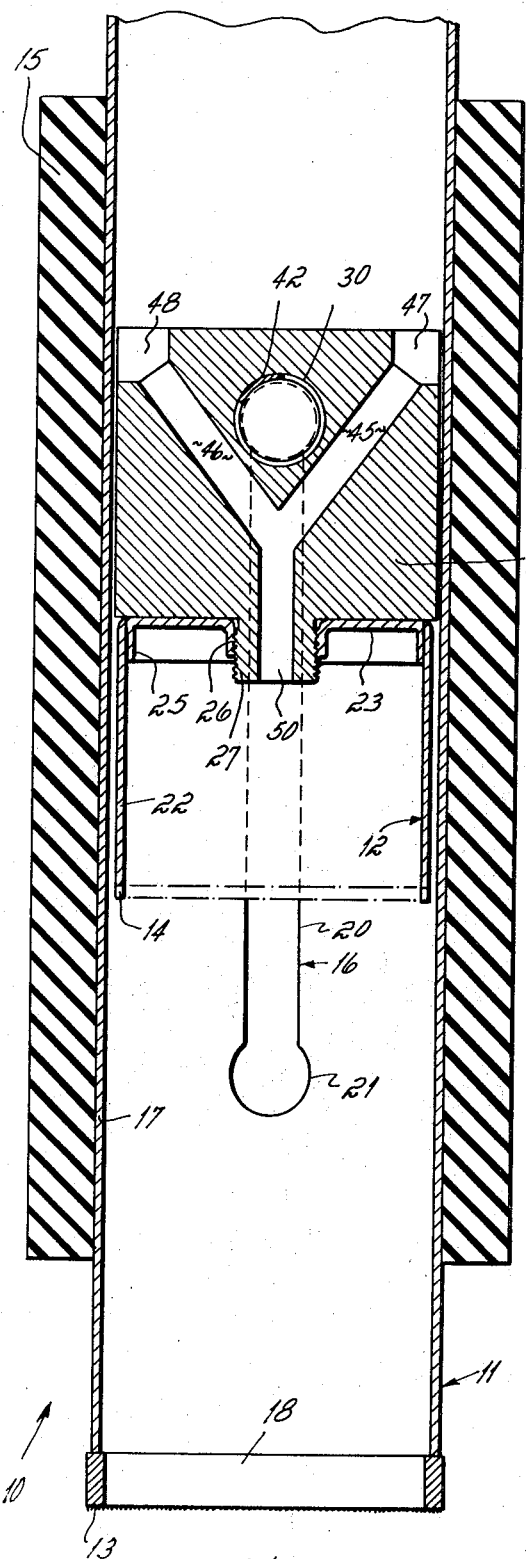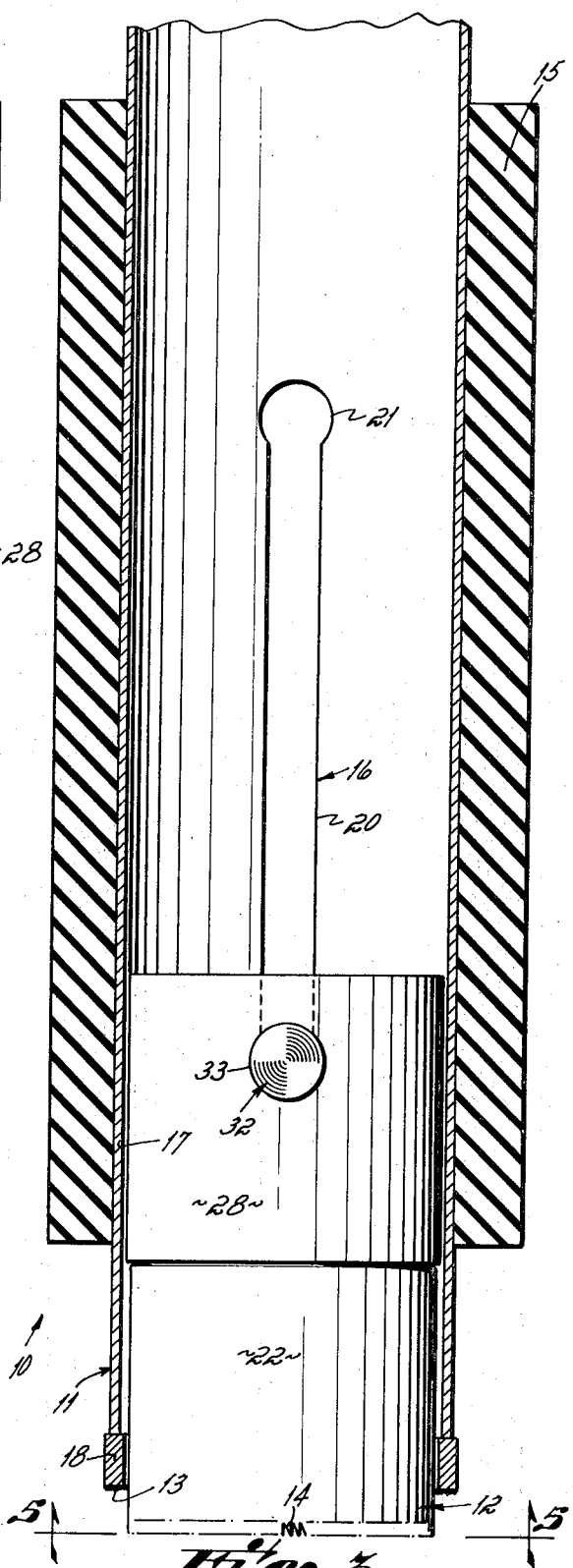

COMBINATION MASONRY DIAMOND BIT AND METAL HOLE-CUTTING SAW

BACKGROUND OF THE INVENTION

This invention relates to drilling apparatus and is particularly directed to a combined masonry drill and metal hole-cutting saw.

In recent years it has become common practice to provide precast concrete beams, panels, and similar structural members. These members are frequently prestressed and are provided with internal metallic conduits. The metallic conduits serve to both reinforce the concrete member and to provide raceways for wiring and the like. In the past, considerable inconvenience has been encountered in drilling reinforced concrete members of this type. Conventionally, concrete is drilled by means of a rotary drill head having an annular cutting surface formed of diamond chips or the like. While this type of cutter is effective for cutting concrete, it will not effectively cut through the metal conduit. Consequently, it has been necessary to utilize a separate drill for this purpose.

SUMMARY OF THE INVENTION

The present invention is directed to a unitary tool which combines a masonry cutting drill and a metal saw. In accordance with the present invention, the metal saw is telescopically mounted within a sleeve member, or head, carrying the diamond drill surface. Means are provided for holding the saw in a retracted position so that only the masonry cutting drill is effective to contact the workpiece. Means are further provided for securing the hole saw in an extended, operative position in which its teeth extend beyond the diamond cutting surface, whereby the saw teeth can be utilized to cut through metal reinforcing structures.

One of the principal advantages of the present construction is that a workman can utilize a single tool for cutting through a composite structure, such as a reinforced concrete panel, or the like. Moreover, the workman can quickly and easily change over the tool from a masonry cutter to a metal cutter without disconnecting the tool from the drilling apparatus.

A still further advantage of the present tool is that the outer metal cutting sleeve serves as a guide for the metal cutting saw when the latter is in operation.

It is a further object of the present invention to provide a combined masonry bit and metal cutting saw including means for applying a coolant fluid to the masonry bit. In accordance with the present invention, a fluid path is provided through the interior of the masonry drill head, and through the supporting structure of the metal saw so that coolant fluid introduced at the upper end of the masonry drill will flow inside the drill, past the saw, and will flow onto the surface being cut by the masonry drill.

A further advantage of the present drill construction is that the metal hole-cutting saw is effective to eject any slug of concrete retained within the masonry drill as an incident to the shifting of the metal saw to its extended, or operative position.

These and other objects and advantages of the present invention will be more readily apparent from a further consideration of the following detailed description of the drawings illustrating a preferred embodiment of the invention.

BRIEF DESCRIPTION OF THE DRAWINGS

FIG. 1 is a longitudinal cross-sectional view through a combined masonry drill and saw constructed in accordance with the principles of the present invention.

FIG. 2 is a cross-sectional view taken along line 2—2 of FIG. 1 with the hole-cutting saw in its retracted position.

FIG. 3 is a longitudinal view, partly in section, showing the saw in an extended or operative position.

FIG. 4 is an end view with the saw retracted taken generally along line 4—4 of FIG. 1.

FIG. 5 is an end view with the saw extended taken generally along line 5—5 of FIG. 3.

DESCRIPTION OF A PREFERRED EMBODIMENT

The overall construction of the combined masonry bit and hole-cutting saw 10 is best shown in FIGS. 1–3. As there shown, the unit comprises a masonry drill head 11 and a circular hole-cutting saw 12 mounted within the head 11 and positionable in either a retracted position, as shown in FIGS. 1 and 2, or in an extended, or operative, position, as shown in FIG. 3. When the saw is in its retracted position as shown in FIG. 2, only the annular diamond-tipped cutting surface 13 of the masonry bit contacts the work. However, when the saw is in its extended position as shown in FIG. 3, the circular saw teeth 14 project outwardly beyond the diamond masonry cutting surface 13 so that the saw teeth are disposed for cutting engagement with the work.

The outer surface of the drill head 11 is surrounded by a resilient sleeve 15 formed of rubber, plastic or the like, the sleeve being effective to seal the two elongated guide slots 16—16 formed in the head 11 for the purpose of preventing escape of coolant fluid in the manner explained below.

More particularly, drill head 11 includes an elongated steel sleeve member 17. The sleeve member carries at its lowermost end an annular metallic ring 18 which is welded, brazed, or otherwise secured to the end of the sleeve. The annular ring 18 has embedded in its exposed endwise surface a suitable abrasive cutting material, such as diamond chips, special alloy segments, or the like. The steel sleeve member 17 is provided intermediate its ends with two elongated slots 16—16. One of the slots is of a double keyhole configuration and includes an elongated section 20 of uniform diameter and two endwise, generally circular, enlarged portions 21. The opposite slot 16 is preferably of substantially the same length and includes only a section of uniform width corresponding to section 20 without any enlarged endwise portions. The upper end of the head 11 is adapted to be mounted in conventional drilling apparatus effective to rotate head 11 about its longitudinal axis.

The hole saw 12 is preferably a cup-shaped member having a cylindrical side wall portion 22 and a transverse upper wall 23. The lower edge of side wall 22 is provided with suitable cutting teeth 14, while the upper edge of the side wall is secured in a suitable manner, as by welding, to a depending flange 25 of the upper transverse wall member. The transverse upper wall 23 is provided with a central threaded aperture 26 adapted to threadably receive a threaded stud 27 extending downwardly from the bottom face of saw mounting cylinder 28.

Mounting cylinder 28 is of a slightly smaller diameter than the inside diameter of head member 11 whereby the cylindrical member and saw are slidable within the head member. The cylinder is provided with a transverse bore 30. This bore houses a locking and positioning button 31 and a guide button 32. Guide button 32 includes a cylindrical projection 33 extending outwardly through a portion 34 of bore 30. Portion 34 of the core is of reduced diameter and a shoulder 35 is formed where portion 34 joins the enlarged section of line 30. Projection 33 of guide button 32 extends outwardly beyond the surface of cylinder 28 into engagement with the uniform elongated guide slot 16 formed in sleeve 17. The inner portion of guide button 32 is provided with an enlarged head 36 slidably mounted within bore 30 and disposed for engagement with shoulder 35 to retain the guide button in assembled relationship with the cylinder.

The opposite end of bore 30 houses a cylindrical portion 37 of a lock and positioning button 31. Cylindrical portion 37 of this lock and positioning button is joined to an enlarged head portion 38 of the button, the head 38 being disposed within an enlarged endwise bore portion 40. The outer face of head 38 carries a cylindrical stub projection 41 which extends outwardly beyond the periphery of cylinder 28. The projection is of a diameter greater than the width of the narrow portion 20 of slot 16 and is slightly smaller than the enlarged endwise portions 21 with the result that when projection 41 is inserted in either enlarged portion 31, the projection, and hence cylinder 28 and saw 12, are locked against endwise movement relative to head member 11. A compression spring 42 is disposed within bore 30 and is compressed between lock button 31 and guide button 32, the spring being effective to urge each of these buttons outwardly.

The lock and guide buttons provide means for positioning the saw either in a retracted position, as shown in FIG. 2, or in an extended position, as shown in FIG. 3. More particularly, the saw is retained in the retracted position shown in FIG. 2 by the outward projection of lock button 31 in such a manner that projection 41 is received within the upper enlarged end 21 of slot 16. The engagement of this projection with the walls of the slot prevents any downward movement of the cylinder 28 or saw member 12. Rotative movement of the saw relative to sleeve 17 is prevented by the engagement of alignment pin 33 with the opposite slot 16.

In order to shift the saw from its retracted to its extended, or operative, position, locking button 31 is forced inwardly against the force of compression spring 42. This is preferably accomplished by the insertion of a rod-like tool into a countersunk opening 43 formed in the exposed face of the locking button. This tool preferably extends into the opening for an appreciable depth, for example, one-half inch, and is used to shift the cylinder and saw member downwardly, i.e., the tool member is moved in a downward direction through slot 16. When the saw reaches its extended position shown in FIG. 4, the locking button is in alignment with the lower enlargement 21 of slot 16. The rod-like tool is withdrawn and the button is permitted to be shifted outwardly by the force of compression spring 42 to lock the saw in its extended position in which the saw teeth protrude an appreciable distance, for example, ¼ inch, beyond the lowermost diamond cutting edge 13 of the masonry bit. When the saw is in this position, it is forced to rotate with sleeve 17 by the engagement of buttons 31 and 32 with the respective slots 16 in the sleeve 17.

In addition to the elements described above, the present drill also is provided with means for applying a cooling fluid to the diamond cutting tip. More particularly, the upper end of drill head 11 is hollow and can be connected to any suitable source of cutting fluid. Two angulated fluid channels 45 and 46 are bored within cylinder 28. The upper ends of these channels terminate in hollow pockets 47 and 48 formed in the upper surface of the cylinder. The lower ends of channels 45 and 46 are connected to a discharge channel 50 which extends downwardly through threaded stud 27.

Thus, fluid flows from the upper portion of head 11 through channels 45 and 46 and is discharged within the interior of saw 12. Fluid flows downwardly through the lower portion of head 11 into the area being cut by diamond bit 13. Outward leakage through slots 16 is prevented by sleeve 15 which snugly fits around the outside of head member 11 and seals the slots.

The saw can be returned to its retracted position by again inserting the rod-like tool into the opening formed in the face of the lock button. This button is forced inwardly out of engagement with the lower enlarged section 21 of slot 16. The tool then is shifted upwardly through the narrow section of the slot to move the saw in its mounting cylinder 28 upwardly to the fully retracted position shown in FIGS. 1 and 2. When the saw is fully retracted, the tool is withdrawn from engagement with lock button 31 and this button is released so that it springs outwardly through the upper enlarged portion 21 to lock the saw in place.

It will readily be appreciated that the saw can be shifted at will between its extended and retracted positions without disconnecting the drill from the drilling apparatus. It will further be appreciated that when the drill is shifted from its retracted position, as shown in FIG. 2, to its extended position, as shown in FIG. 3, any slug of concrete caught within the lower end of the drill head 11 will be forced outwardly and discharged from the interior of the drill head. It is to be understood that resilient sleeve 15 is shifted along steel sleeve 17 to provide access to locking button 31. After the saw has been positioned and the locking button released, the resilient sleeve is returned to its position covering slots 16.

From the foregoing disclosure of the general principles of the present invention and the above description of a preferred embodiment, those skilled in the art will readily comprehend various modifications to which the invention is susceptible. Therefore, I desire to be limited only by the scope of the following claims.

Having described my invention, I claim:

1. A combined masonry drill and metal saw comprising:
   a sleeve member adapted for engagement at one end to drilling apparatus;
   an annular masonry cutting surface formed on the opposite end of said sleeve;
   a mounting member disposed within said sleeve and shiftable axially thereof;
   a metal hole-cutting saw secured to said mounting member;

means for selectively locking said mounting member in a first position with said saw in an inoperative position wholly retracted within said sleeve and for selectively locking said mounting member in a second position with said saw disposed in an operative position with the saw extending outwardly beyond said masonry cutting surface, whereby the saw is effective to cut a hole in a piece of metal which has been exposed by the previous action of said masonry cutting surface, said means comprising:

a transverse opening formed in said mounting member;

a locking projection mounted within said opening; spring means urging said projection outwardly;

an elongated slot formed within said sleeve, said slot having a narrow portion and two endwise enlarged portions;

said projection being adapted to be received in said enlarged portions and being larger than the width of the narrow portion of said slot.

2. The combined masonry drill and metal saw of claim 1 in which said locking projection is provided with a recess in the outer portion thereof for reception of a tool effective to force said projection inwardly to disengage it from the enlarged portion of said slot and to force said mounting member longitudinally of said sleeve.

3. The combined masonry drill and metal saw of claim 1 in which said mounting member carries a second projection and said sleeve is provided with a second elongated slot for receiving said second projection.

4. The combined masonry drill and metal saw of claim 1 in which said saw is formed on a cup-like member and said mounting member is a cylinder.

5. The combined masonry drill and metal saw of claim 4 in which said cylinder includes a threaded projection and said cup-like member includes a threaded aperture in mating engagement therewith.

6. The combined masonry drill and metal saw of claim 5 in which said cylinder is provided with a fluid conduit formed thereon, said conduit extending completely through said cylinder and discharging through said threaded projection, whereby coolant fluid introduced at one end of said sleeve flows through said sleeve and said cylinder and is discharged adjacent to said annular masonry cutting surface.

7. The combined masonry drill and metal saw of claim 6 further comprising a resilient sleeve surrounding said sleeve member, said resilient sleeve being effective to form a fluid-tight seal over said slots.

* * * * *